United States Patent
Wang et al.

(10) Patent No.: US 12,174,740 B2
(45) Date of Patent: Dec. 24, 2024

(54) METHOD AND APPARATUS FOR ADJUSTING DATA STORAGE AND COMPUTER DEVICE

(71) Applicant: SHANGHAI BILIBILI TECHNOLOGY CO., LTD., Shanghai (CN)

(72) Inventors: Sheng Wang, Shanghai (CN); Shangzhi Cai, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 94 days.

(21) Appl. No.: 18/026,259

(22) PCT Filed: Jun. 30, 2021

(86) PCT No.: PCT/CN2021/103644
§ 371 (c)(1),
(2) Date: Mar. 14, 2023

(87) PCT Pub. No.: WO2022/057379
PCT Pub. Date: Mar. 24, 2022

(65) Prior Publication Data
US 2023/0359561 A1 Nov. 9, 2023

(30) Foreign Application Priority Data
Sep. 17, 2020 (CN) .............. 202010979551

(51) Int. Cl.
*G06F 12/0811* (2016.01)
(52) U.S. Cl.
CPC .. *G06F 12/0811* (2013.01); *G06F 2212/1021* (2013.01)

(58) Field of Classification Search
CPC ............. G06F 12/0811; G06F 12/0868; G06F 16/172; G06F 16/24552; G06F 16/70;
(Continued)

(56) References Cited

U.S. PATENT DOCUMENTS

| 10,496,290 B1 | 12/2019 | Visvanathan et al. |
| 2015/0067262 A1 | 3/2015 | Uttamchandani et al. |

FOREIGN PATENT DOCUMENTS

| CN | 103927265 A | 7/2014 |
| CN | 103942289 A | 7/2014 |

(Continued)

OTHER PUBLICATIONS

International Patent Application No. PCT/CN2021/103644; Int'l Search Report; dated Oct. 9, 2021; 2 pages.

*Primary Examiner* — Hashem Farrokh
(74) *Attorney, Agent, or Firm* — BakerHostetler (57) ABSTRACT

The present application discloses techniques for adjusting data storage. The techniques comprises receiving a request of accessing target content from a user; determining a content size of the target content, and querying a cache unit to identify a set of cache blocks storing the target content; determining a space hit ratio based on the content size and a storage capacity corresponding to the set of cache blocks; adjusting an initial block size of the cache unit based on the space hit ratio and a block size of a lower-level storage relative to the cache unit to obtain a new block size of the cache unit when the space hit ratio is less than a predetermined threshold; and configuring newly set up cache blocks for the cache unit based on the new block size.

19 Claims, 3 Drawing Sheets

(58) Field of Classification Search
CPC ......... G06F 16/9574; G06F 2212/1021; G06F 2212/601; G06F 2212/652; G06F 3/061; G06F 3/0631; G06F 3/0656; G06F 3/067; G06F 12/08; G06F 16/972; G06F 16/986; G06F 3/0607; G06F 3/0644; Y02D 10/00
USPC ....................................................... 711/122
See application file for complete search history.

(56) References Cited

FOREIGN PATENT DOCUMENTS

| | | | |
|---|---|---|---|
| CN | 105205014 | A | 12/2015 |
| CN | 108628769 | A | 10/2018 |
| CN | 110069219 | A | 7/2019 |
| CN | 110221989 | A | 9/2019 |
| CN | 110308875 | A | 10/2019 |
| CN | 110377572 | A | 10/2019 |
| CN | 110471894 | A | 11/2019 |
| CN | 110688062 | A | 1/2020 |
| CN | 110968762 | A | 4/2020 |
| CN | 111339057 | A | 6/2020 |
| CN | 112417350 | A | 2/2021 |

METHOD AND APPARATUS FOR ADJUSTING DATA STORAGE AND COMPUTER DEVICE

CROSS-REFERENCE TO RELATED APPLICATIONS

The present application is the U.S. National Stage of International Application No. PCT/CN2021/103644, filed on Jun. 30, 2021, which claims priority to Chinese Patent Application No. 202010979551.2, filed with the China National Intellectual Property Administration on Sep. 17, 2020, and entitled "METHOD AND APPARATUS FOR ADJUSTING DATA STORAGE AND COMPUTER DEVICE", both of which are incorporated herein by reference in their entireties.

TECHNICAL FIELD

The present application relates to the technical field of computers, and in particular, to a method and apparatus for adjusting data storage, a computer device, and a computer-readable storage medium.

BACKGROUND ART

As computer network technologies develop, the data service industry has developed rapidly. People can obtain more and more abundant data resources from a network, for example, obtaining various video data through a video service platform, querying an online library for various textual and graphic data, and searching for various information directly using a search engine. A data service provider establishes a data server, and then provides data on the data server for each network user via the Internet.

For data storage, most data servers currently slice data content or save the whole file to a local disk. Due to different access speeds of different memories, the data server generally caches part of content that is relatively hot to a cache unit, such as a memory, so as to implement a quick response to a data service request of a user. However, the inventors realize that, in practical application, due to the inconsistent preferences of users, the accuracy of hotspot statistics is not very high, resulting in a low hit rate for data accesses in the cache unit and a large reduction in use efficiency of the cache unit.

SUMMARY OF THE INVENTION

The present application provides a method and apparatus for adjusting data storage and a computer device, which can solve the problems of a low hit rate of a cache unit and low use efficiency of the cache unit in the prior art.

First, in order to achieve the above objective, the present application provides a method for adjusting data storage, including: receiving a request of accessing target content from a user; determining a content size of the target content, and querying a cache unit to identify a set of cache blocks storing the target content; determining a space hit ratio based on the content size and a storage capacity corresponding to the set of cache blocks; adjusting an initial block size of the cache unit based on the space hit ratio and a block size of a lower-level storage relative to the cache unit to obtain a new block size of the cache unit when the space hit ratio is less than a predetermined threshold, wherein the lower-level storage is a storage unit configured to directly exchange content with the cache unit and have an access speed less than that of the cache unit; and configuring newly set up cache blocks for the cache unit based on the new block size.

In an example, when the target content is part of content in a target file, the determining a content size of the target content further comprises: dividing the target file into a sequence of data segments, each of the sequence of data segments having a same size; obtaining a ranking range of a subset of data segments corresponding to the target content in all the sequence of data segments; and determining the content size of the target content based on a content size of the target file and a ratio of a quantity of the subset of data segments in the ranking range to a quantity of all the sequence of data segments.

In an example, the querying a cache unit to identify a set of cache blocks storing the target content further comprises: identifying cache blocks corresponding to the ranking range in a cache block segment of the cache unit where the target file is stored as the set of cache blocks storing the target content.

In an example, when the target file is a video file and the target content is a video clip, the ranking range corresponds to a time section of the video clip in the video file.

In an example, the determining a space hit ratio based on the content size and a storage capacity corresponding to the set of cache blocks further comprises: determining the storage capacity corresponding to the set of cache blocks based on multiplying a quantity of cache blocks comprised in the set of cache blocks by the initial block size of the cache unit; and determining a ratio of the content size of the target content to the storage capacity corresponding to the set of cache blocks and identifying the ratio as the space hit ratio.

In an example, the adjusting an initial block size of the cache unit based on the space hit ratio and a block size of a lower-level storage relative to the cache unit to obtain a new block size of the cache unit further comprises: multiplying the space hit ratio by the initial block size to obtain an intermediate block size value; and adjusting the intermediate block size value based on the block size of the lower-level storage to obtain the new block size of the cache unit, wherein the block size of the lower-level storage is an integral multiple of the new block size.

In an example, when a plurality of requests for accessing a plurality of different pieces of content are received within a same time period, the method further comprises: determining a space hit ratio for each piece of content as a sub-space-hit ratio; and performing a weighting calculation or an average calculation on all of the sub-space-hit ratios to obtain a space hit ratio corresponding to the time period.

In addition, in order to achieve the above objective, the present application further provides apparatus for adjusting data storage, including: a receiving module, configured to receive a request of accessing target content from a user; a query module, configured to determine a content size of the target content, and query a cache unit to identify a set of cache blocks storing the target content; a calculation module, configured to determine a space hit ratio based on the content size and a storage capacity corresponding to the set of cache blocks; an adjustment module, configured to adjust an initial block size of the cache unit based on the space hit ratio and a block size of a lower-level storage relative to the cache unit to obtain a new block size of the cache unit when the space hit ratio is less than a predetermined threshold, wherein the lower-level storage is a storage unit that directly exchanges content with the cache unit and has an access speed less than that of the cache unit; and a setting module, configured to configure newly set up cache blocks for the cache unit based on the new block size.

Further, the present application further provides a computer device, including a memory and a processor, where the memory stores computer-readable instructions capable of running on the processor, and when the computer-readable instructions are executed by the processor, the processor implements operations comprising: receiving a request of accessing target content from a user; determining a content size of the target content, and querying a cache unit to identify a set of cache blocks storing the target content; determining a space hit ratio based on the content size and a storage capacity corresponding to the set of cache blocks; adjusting an initial block size of the cache unit based on the space hit ratio and a block size of a lower-level storage relative to the cache unit to obtain a new block size of the cache unit when the space hit ratio is less than a predetermined threshold, wherein the lower-level storage is a storage unit configured to directly exchange content with the cache unit and have an access speed less than that of the cache unit; and configuring newly set up cache blocks for the cache unit based on the new block size.

Further, in order to achieve the above objective, the present application further provides a computer-readable storage medium storing computer-readable instructions, where the computer-readable instructions may be executed by at least one processor to cause the at least one processor to perform operations comprising: receiving a request of accessing target content from a user; determining a content size of the target content, and querying a cache unit to identify a set of cache blocks storing the target content; determining a space hit ratio based on the content size and a storage capacity corresponding to the set of cache blocks; adjusting an initial block size of the cache unit based on the space hit ratio and a block size of a lower-level storage relative to the cache unit to obtain a new block size of the cache unit when the space hit ratio is less than a predetermined threshold, wherein the lower-level storage is a storage unit configured to directly exchange content with the cache unit and have an access speed less than that of the cache unit; and configuring newly set up cache blocks for the cache unit based on the new block size.

A method and apparatus for adjusting data storage, a computer device, and a computer-readable storage medium provided in the present application can receive an access request sent by a user for target content; then obtain a content size of the target content, and query a cache unit to find a cache block set storing the target content; calculate a space hit ratio based on the content size and the storage capacity corresponding to the cache block set; when the space hit ratio is less than a preset threshold, adjust an initial block size of the cache unit based on the space hit ratio and a block size of lower-level storage of the cache unit to obtain a new block size, where the lower-level storage is a storage unit that directly exchanges content with the cache unit and has an access speed less than that of the cache unit; and finally set a block size of a newly set up cache block of the cache unit based on the new block size. The space hit ratio of cache content on the cache unit is counted, then the cache block size of the cache unit is adjusted when the space hit ratio is relatively low, so that the space hit ratio of the cache unit can be effectively improved, and the use efficiency of the cache unit can be improved.

DETAILED DESCRIPTION OF EMBODIMENTS

To make the objectives, technical solutions, and advantages of the present application clearer and more comprehensible, the present application will be further described in detail with reference to the accompanying drawings and embodiments. It should be understood that the specific embodiments described herein are merely intended to explain the present application, and are not intended to limit the present application. All other embodiments obtained by those of ordinary skill in the art based on the embodiments of the present application without creative efforts shall fall within the protection scope of the present application.

It should be noted that the descriptions related to "first", "second", etc. in the present application are merely used for the illustrative purpose, and should not be construed as indicating or implying the relative importance thereof or implicitly indicating the number of technical features indicated. Thus, features defined with "first" and "second" may explicitly or implicitly include at least one of the features. In addition, technical solutions of various embodiments can be combined with each other, but they must be based on the implementation by those of ordinary skill in the art. When a combination of technical solutions is contradictory or cannot be implemented, it should be considered that such a combination of the technical solutions neither exists, nor falls within the protection scope claimed by the present application.

Figure 1:
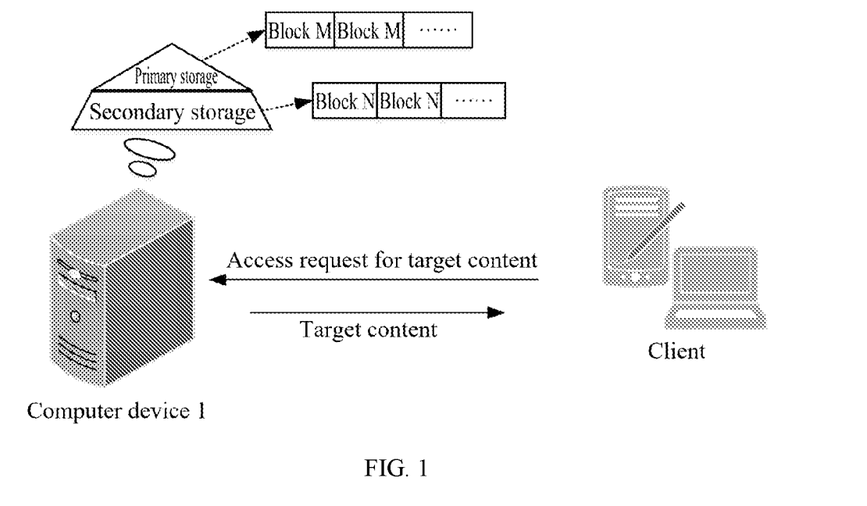
FIG. 1 is a schematic diagram of an application environment according to an embodiment of the present application.

FIG. 1 is a schematic diagram of an application environment according to an embodiment of the present application. Referring to FIG. 1, the computer device 1 is connected to a client, and the computer device 1 includes at least two types of memories of primary storage and secondary storage, where an access speed of the primary storage is greater than that of the secondary storage. In this embodiment, the primary storage is a memory unit, and the secondary storage may be a solid state disk or solid state drive (SSD) storage disk or a hard disk drive (HDD) storage disk. Certainly, in other embodiments, the computer device 1 may alternatively include three levels of storage with access speeds in descending order, which are sequentially a memory unit, an SSD storage disk, and an HDD storage disk, and may alternatively include more levels of storage, which is not limited herein. The computer device 1 stores data resources through the primary storage and the secondary storage, and can receive an access request sent by the client for target content, find the target content from the primary storage or the secondary storage based on the access request, and feed the target content back to the client.

In this embodiment, the computer device 1 stores different files or different content blocks of the same file through the primary storage and the secondary storage. In a specific embodiment, the computer device 1 stores a relatively hot file or content block with a higher access frequency in the primary storage, and stores a relatively cold file or content block with a lower access frequency in the second-level storage; and when the relatively hot file or content block becomes relatively cold, the computer device 1 transfers the file or content block from the primary storage to the secondary storage, or when the relatively cold file or content block becomes relatively hot, the computer device 1 transfers the file or content block from the secondary storage to the primary storage.

Generally, the memory stores data in a blocking manner. Referring to the table below, a frequency hit ratio P=a quantity of hit times/a total quantity of access times, and a space hit ratio S=content used within a hit block/a block size.

A higher value of P indicates that the content stored is relatively hot, or conversely, a lower value of P indicates that the content is relatively cold; while a higher value of S indicates a high utilization rate of a corresponding cache block or a plurality of corresponding blocks storing the content, or conversely, a lower value of S indicates a low utilization rate. Therefore, for a data service provider, the pursuit of a higher value of P and a higher value of S can effectively increase the utilization efficiency of a data server, and thus reduce server costs.

For example, a video server may be equipped with a memory, an SSD storage disk, and an HDD storage disk. Obviously, their access speeds are in the following order: memory>SSD>HDD. The video server stores a video source file on the HDD disk and then caches popular video content on the SSD and the memory. Due to that a whole video file may have a size of several gigabytes (GB), it is obviously unlikely to cache the content of the whole file directly, and a general method is to slice the file into data pieces, for example, data pieces each with a size of 2 megabytes (MB), and cache data pieces with a relatively high access frequency on the memory or SSD. In this way, at the request of a user, part of the popular video content is read from the memory or SSD and sent, part of less popular video content is read from the HDD disk and sent, and the overall service performance is greatly improved compared with reading from the HDD disk alone.

In this embodiment, the primary storage serves as a cache unit and the secondary storage serves as lower-level storage of the cache unit. The computer device 1 can periodically execute the following steps: receiving an access request sent by a user for target content; obtaining a content size of the target content, and querying a cache unit to find a cache block set storing the target content; calculating a space hit ratio based on the content size and a storage capacity corresponding to the cache block set; when the space hit ratio is less than a preset threshold, adjusting an initial block size of the cache unit based on the space hit ratio and a block size of lower-level storage of the cache unit to obtain a new block size, where the lower-level storage is a storage unit that directly exchanges content with the cache unit and has an access speed less than that of the cache unit; and setting a block size of a newly set up cache block of the cache unit based on the new block size. The computer device 1 dynamically adjusts a size of a cache block in the cache unit based on the space hit ratio of the data access stored in the cache unit, to avoid a case where the hit ratio of the cache unit is not high and the use efficiency of the cache unit is relatively low. In this embodiment, the computer device 1 may be an electronic device such as a mobile phone, a tablet computer, a portable device, a PC or a server; and may alternatively be added to the electronic device as an independent function module to implement a function of adjusting cache memory.

Embodiment 1

Figure 2:
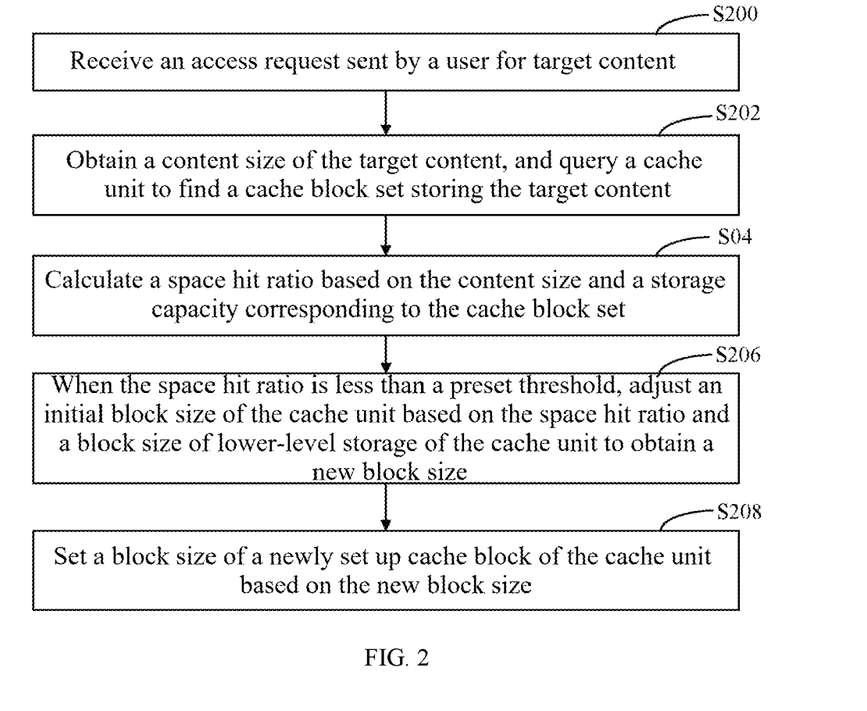
FIG. 2 is a schematic flowchart of a method for adjusting data storage according to a specific embodiment of the present application.

FIG. 2 is a schematic flowchart of a method for adjusting data storage according to an embodiment of the present application. It may be understood that the flowchart in this method embodiment is not intended to limit an execution sequence of the steps. Exemplary description is made below by using a computer device 1 as an executor.

As shown in FIG. 2, the method for adjusting data storage may include steps S200 to S208.

In step S200, an access request sent by a user for target content is received.

In step S202, a content size of the target content is obtained, and a cache unit is queried to find a cache block set storing the target content.

In this embodiment, the computer device 1 is connected to a client, and may receive the access request sent by the client for relatively hot target content, that is, the target content stored in the cache unit. In other embodiments, the computer device 1 may also directly provide an interactive interface and receive the access request sent by a user for the target content through the interactive interface, for example, receive a click operation or a voice instruction of the user through a display interface and recognize the click operation or voice instruction, so as to recognize the corresponding access request, which is not limited herein.

After receiving the access request sent by the user for the target content, the computer device 1 further obtains the content size of the target content, for example, an amount of data in MB or GB; and queries the cache unit to find the cache block set for storing the target content, for example, the computer device 1 finds sequence numbers or numbers of cache blocks for caching the target content, and then uses the cache blocks as a set; and all corresponding cache blocks storing the target content can be located based on the sequence numbers or numbers in the set.

In an exemplary example, the target content may alternatively be part of content of a file, for example, when the computer device 1 is a video server, the computer device 1 can receive a viewing request of the user for a target video. When the user needs to view only a specific video clip, the target content corresponding to the access request received by the computer device 1 is a video clip of a video file.

Figure 3:
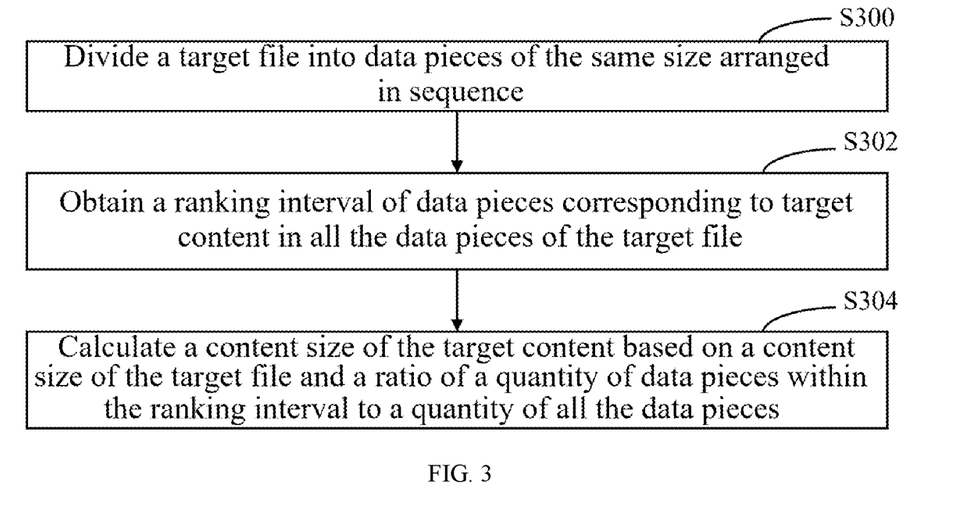
FIG. 3 is a schematic flowchart of a specific embodiment of obtaining a content size of target content in step S202 of FIG. 2, where the target content is part of content in a target file.

As shown in FIG. 3, when the target content is part of content of the target file, obtaining, by the computer device 1, the content size of the target content includes steps S300 to S304.

In step S300, the target file is divided into data pieces of the same size arranged in sequence.

In step S302, a ranking interval of data pieces corresponding to the target content in all the data pieces of the target file is obtained.

In step S304, the content size of the target content is calculated based on the content size of the target file and a ratio of a quantity of data pieces within the ranking interval to a quantity of all the data pieces.

Specifically, when the computer device 1 stores the target file, it needs to divide the target file into a sequence of several data pieces, and then sequentially store the data pieces in each cache block in a corresponding cache segment in the cache unit. Therefore, after receiving the access request sent by the user for the target content, the computer device 1 makes a query to find the ranking interval of the data pieces corresponding to the target content in all the data pieces corresponding to the target file. For example, a 30 MB video file includes 100 video frames, the target content is the $30^{th}$ to the $50^{th}$ video frames therein, and the video file is divided into 20 data pieces; then, after receiving the access request for the target content, the computer device 1 may make a query to find the ranking interval of the target content in the target file, that is, the $6^{th}$ to the $10^{th}$ data pieces in the 20 data pieces; next, the content size of the target content is calculated based on the ranking interval and the content size of the target file, that is, ((10−6+1)/20)*30 MB=7.5 MB.

Querying, by the computer device 1, the cache unit to find the cache block set storing the target content specifically includes: finding cache blocks corresponding to the ranking interval in a cache block segment of the cache unit where the target file is stored and using the cache blocks as the cache block set storing the target content. For example, the 30 MB video file includes 100 video frames, the target content is the $30^{th}$ to the $50^{th}$ video frames therein, and the video file is divided into 20 data pieces; the 20 data pieces are sequentially stored in 10 cache blocks of the cache unit; a cache block sequence number interval of the cache block set corresponding to the target content is the $((6/20)*10)^{th}$ to the $((10/20)*10)^{th}$ cache blocks, that is, the $2^{nd}$ to the $5^{th}$ cache blocks of the 10 cache blocks (where the sequence number of the starting cache block is (6/20)*10=1.5 (2 obtained after rounding), that is, the $2^{nd}$ cache block).

In another specific embodiment, when the target file is a video file and the target content is a video clip, the ranking interval is a time segment of the video clip in the video file. Specifically, when the computer device 1 receives the access request of the user for the target content, that is, an access request for a video clip in a specific time segment of the video file, the computer device 1 may directly calculate a ranking interval of the video clip in the video file based on the time segment of the video clip and the total time of the video file; then calculate a content size of the video clip based on the ranking interval and a size of the video file; and make a query to find, based on the ranking interval and all the cache blocks storing the video file, a cache block set corresponding to the video clip.

In step S204, a space hit ratio is calculated based on the content size and a storage capacity corresponding to the cache block set.

Specifically, a process of calculating the space hit ratio by the computer device 1 includes: first multiplying a quantity of cache blocks included in the cache block set by the initial block size of a cache block in the cache unit to obtain the storage capacity corresponding to the cache block set; and then calculating a ratio of the content size of the target content to the storage capacity corresponding to the cache block set and using the ratio as the space hit ratio.

For example, assuming that a range of the target content requested by the user is [a, b], where a and b represent download size locations of the target content in the target file, for example, a starting point of the target content is at a location where the target file is downloaded to a size of 100 MB, and an ending point of the target content is at a location where the target file is downloaded to a size of 200 MB, that is, the range of the target content that corresponds to 100 MB to 200 MB of the target file is [100, 200]; and the initial block size of the cache block in the cache unit is M, block sequence numbers of the cache blocks corresponding to the target content within the range of [a, b] are [Cstart, Cend], where Cstart=[a/M], and [a/M] is a rounded value obtained by dividing a by M; and Cend=[b/M], where [b/M] is a rounded value obtained by dividing b by M. A space hit ratio of the access of the user to the target content is Sx=(b−a+1)/((Cend−Cstart+1)*M).

In another specific embodiment, when access requests for a plurality of different pieces of content are received within the same time period, the computer device 1 may: calculate a space hit ratio for each piece of content and use the space hit ratio as a sub-space hit ratio; and perform a weighting calculation or an average calculation on all the sub-space hit ratios to obtain a space hit ratio corresponding to the time period. For example, the computer device 1 obtains the space hit ratio of the time period by calculating an average value of sub-space hit ratios corresponding to access requests of two different pieces of content of the same time period; or different weights are assigned to two sub-space hit ratios to calculate the space hit ratio of the time period, which is not limited herein.

In step S206, when the space hit ratio is less than a preset threshold, an initial block size of the cache unit is adjusted based on the space hit ratio and a block size of lower-level storage of the cache unit to obtain a new block size, where the lower-level storage is a storage unit that directly exchanges content with the cache unit and has an access speed less than that of the cache unit.

After the space hit ratio of the user accessing the target content is calculated, the computer device 1 further determines whether the space hit ratio is less than the preset threshold, for example, 80%, when the space hit ratio is less than the preset threshold, the computer device 1 may adjust the initial block size of the cache unit based on the space hit ratio and the block size of the lower-level storage of the cache unit, so as to obtain the new block size, specifically includes: multiplying the space hit ratio by the initial block size to obtain an intermediate block size value; and adjusting the intermediate block size value based on the block size of the lower-level storage to obtain the new block size, such that the block size of the lower-level storage is an integral multiple of the new block size. For example, if the initial block size of the cache block of the cache unit is M, the space hit ratio is Sx, and a block size of storage blocks of the lower-level storage is N, the intermediate block size value is M'=M*Sx, and the new block size is Mnew=N/[N/M'], where [N/M'] is a rounded value obtained by dividing N by M'.

In this embodiment, each of the cache unit and the lower-level storage stores relatively hot content and relatively cold content, and when the relatively cold content on the lower-level storage becomes hot, the content can be directly transferred to the cache unit; or conversely, when the relatively hot content on the cache unit becomes cold, the content may also be transferred to the lower-level storage. The storage blocks on the lower-level storage are generally fixed, and the cache block of the cache unit is set to a smaller size, to improve the utilization rate of the cache unit; and therefore, to facilitate the data transfer between the cache unit and the lower-level storage, the cache block size of the cache unit is set to be in a multiple relationship with the storage block size of the lower-level storage (the block size of the storage block of the lower-level storage is a multiple of the cache block size of the cache unit), thereby effectively improving storage efficiency.

In step S208, a block size of a newly set up cache block of the cache unit is set based on the new block size.

After the new block size of the cache block of the cache unit is calculated, the computer device 1 sets the block size of the newly set up cache block of the cache unit based on the new block size. For example, when specific content on the lower-level storage corresponding to the cache unit needs to be transferred to the cache unit, the computer device 1 newly sets up the cache block corresponding to the new block size on the cache unit, to be used to store the transferred content.

In another specific embodiment, after newly setting up, based on the new cache block size, a cache block to store the content, the computer device 1 further counts a space hit ratio. When it is counted that the new space hit ratio is less than the preset threshold, the initial block size is used again instead of the new block size, and when a new cache block needs to be set up in the cache unit next time, a block size of the newly set up cache block is set based on the initial block size.

Figure 4:
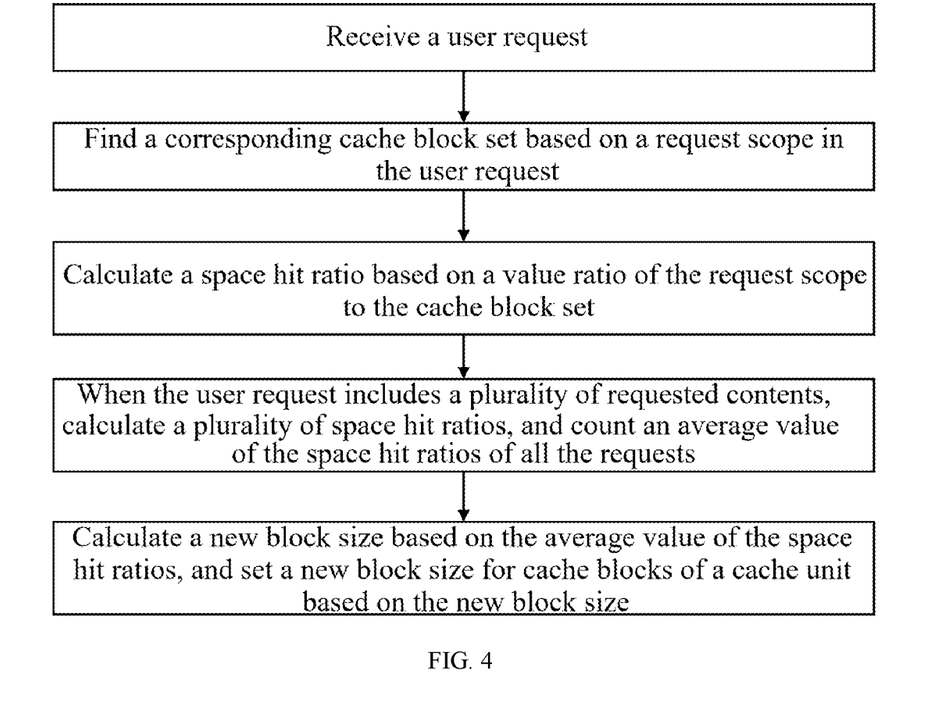
FIG. 4 is an effect flowchart of an exemplary example of a method for adjusting data storage according to the present application.

FIG. 4 is an effect flowchart of a method for adjusting data storage according to an exemplary example of the present application. As shown in FIG. 4, after receiving a user request, the computer device 1 finds a corresponding cache block set based on a request scope in the user request, and then calculates a space hit ratio based on a value ratio of the request scope to the cache block set; when the user request includes a plurality of pieces of requested content, a plurality of space hit ratios are calculated, and an average value of the space hit ratios of all the requests is counted; and a new block size is calculated based on the average value of the space hit ratios, and a new block size is set for the cache block of the cache unit based on the new block size.

In conclusion, the method for adjusting data storage provided in this embodiment can receive an access request sent by a user for target content; then obtain a content size of the target content, and query a cache unit to find a cache block set storing the target content; calculate a space hit ratio based on the content size and a storage capacity corresponding to the cache block set; when the space hit ratio is less than a preset threshold, adjust an initial block size of the cache unit based on the space hit ratio and a block size of lower-level storage of the cache unit to obtain a new block size, where the lower-level storage is a storage unit that directly exchanges content with the cache unit and has an access speed less than that of the cache unit; and finally set a block size of a newly set up cache block of the cache unit based on the new block size. The space hit ratio of cache content on the cache unit is counted, and then the cache block size of the cache unit is adjusted when the space hit ratio is relatively low, so that the space hit ratio of the cache unit can be effectively increased, and the use efficiency of the cache unit can be improved; that is, the utilization rate of the memory can be improved and the data in the memory cache can be used as much as possible.

Embodiment 2

Figure 5:
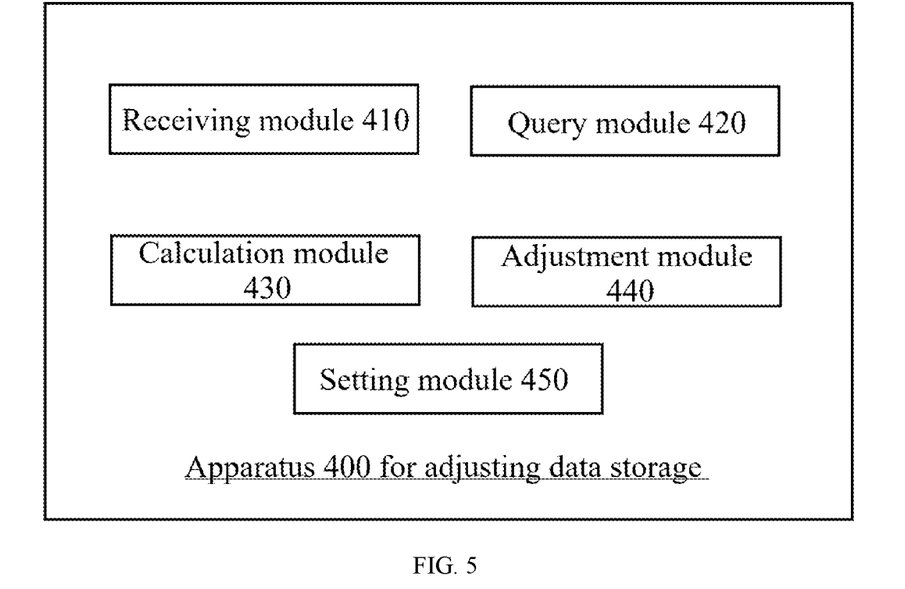
FIG. 5 is a schematic diagram of program modules in an apparatus for adjusting data storage according to an embodiment of the present application.

FIG. 5 is a block diagram schematically showing an apparatus for adjusting data storage according to Embodiment 2 of the present application. The apparatus for adjusting data storage may be divided into one or more program modules, and the one or more program modules are stored in a storage medium and executed by one or more processors to implement the embodiments of the present application. The program modules referred to in the embodiments of the present application refer to a series of computer-readable instruction segments that can complete a specific function. The functions of various program modules in the embodiments will be specifically described in the following descriptions.

As shown in FIG. 5, the apparatus 400 for adjusting data storage may include a receiving module 410, a query module 420, a calculation module 430, an adjustment module 440, and a setting module 450.

The receiving module 410 is configured to receive an access request sent by a user for target content.

The query module 420 is configured to obtain a content size of the target content, and query a cache unit to find a cache block set storing the target content.

The calculation module 430 is configured to calculate a space hit ratio based on the content size and a storage capacity corresponding to the cache block set.

The adjustment module 440 is configured to: when the space hit ratio is less than a preset threshold, adjust an initial block size of the cache unit based on the space hit ratio and a block size of lower-level storage of the cache unit to obtain a new block size, where the lower-level storage is a storage unit that directly exchanges content with the cache unit and has an access speed less than that of the cache unit.

The setting module 450 is configured to set a block size of a newly set up cache block of the cache unit based on the new block size.

In an exemplary embodiment, the query module 420 is further configured to: when the target content is part of content in the target file, divide the target file into data pieces of the same size arranged in sequence; obtain a ranking interval of data pieces corresponding to the target content in all the data pieces of the target file; calculate the content size of the target content based on the content size of the target file and a ratio of a quantity of data pieces within the ranking interval to a quantity of all the data pieces; and find cache blocks corresponding to the ranking interval in a cache block segment of the cache unit where the target file is stored and use the cache blocks as the cache block set storing the target content. where, when the target file is a video file and the target content is a video clip, the ranking interval is a time segment of the video clip in the video file.

In an exemplary embodiment, the calculation module 430 is further configured to: multiply a quantity of cache blocks included in the cache block set by the initial block size of a cache block in the cache unit to obtain the storage capacity corresponding to the cache block set; and calculate a ratio of the content size of the target content to the storage capacity corresponding to the cache block set and use the ratio as the space hit ratio.

In an exemplary embodiment, the adjustment module 440 is further configured to: multiply the space hit ratio by the initial block size to obtain an intermediate block size value; adjust the intermediate block size value based on the block size of the lower-level storage to obtain the new block size, such that the block size of the lower-level storage is an integral multiple of the new block size; when access requests for a plurality of different pieces of content are received within the same time period, calculate a space hit ratio for each piece of content and use the space hit ratio as a sub-space hit ratio; and perform a weighting calculation or an average calculation on all the sub-space hit ratios to obtain a space hit ratio corresponding to the time period.

Embodiment 3

Figure 6:
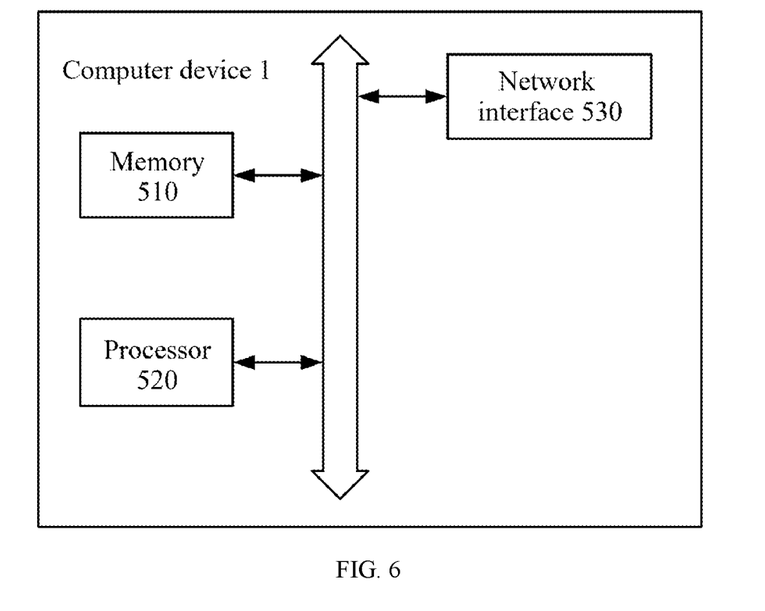
FIG. 6 is a schematic diagram of an optional hardware architecture of a computer device according to the present application.

FIG. 6 is a schematic diagram schematically showing a hardware architecture of a computer device 1 adapted to implement a method for adjusting data storage according to Embodiment 3 of the present application. In this embodiment, the computer device 1 is a device that can automatically perform numerical calculation and/or information processing according to preset or prestored instructions. For example, the computer device may be a rack server, a blade server, a tower server, or a cabinet server having a gateway function (including an independent server or a server cluster composed of a plurality of servers), or the like. As shown in FIG. 6, the computer device 1 at least includes, but is not limited to: a memory 510, a processor 520, and a network interface 530, which may be communicatively linked to each other by using a system bus.

The memory 510 includes at least one type of computer-readable storage medium, and the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 510 may be an internal storage module of the computer device 1, for example, a hard disk or memory of the computer device 1. In some other embodiments, the memory 510 may alternatively be an external storage device of the computer device 1, for example, a plug-in type hard disk equipped on the computer device 1, a smart media card (SMC for short), a secure digital (SD for short) card, or a flash card. Certainly, the memory 510 may alternatively include both the internal storage module of the computer device 1 and the external storage device of the computer device 900. In this embodiment, the memory 510 is generally configured to store an operating system and various types of application software installed on the computer device 1, such as program code for the method for adjusting data storage. In addition, the memory 510 may be further configured to temporarily store various types of data that have been output or are to be output.

The processor 520 may be, in some embodiments, a central processing unit (CPU for short), a controller, a microcontroller, a microprocessor, or other data processing chips. The processor 520 is generally configured to control overall operation of the computer device 1, for example, execute control, processing, and the like related to data exchange or communication with the computer device 1. In this embodiment, the processor 520 is configured to run program code stored in the memory 510 or to process data.

The network interface 530 may include a wireless network interface or a wired network interface. The network interface 530 is generally configured to establish a communication link between the computer device 1 and other computer devices. For example, the network interface 530 is configured to connect the computer device 1 to an external terminal by using a network, and establish a data transmission channel, a communication link, and the like between the computer device 1 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 6 shows only a computer device having components 510 to 530, but it should be understood that not all of the illustrated components are required to be implemented, and more or fewer components may be implemented instead.

In this embodiment, program code for the method for adjusting data storage stored in the memory 510 may alternatively be divided into one or more program modules and executed by one or more processors (the processor 520 in this embodiment) to implement the embodiments of the present application.

Embodiment 4

This embodiment further provides a computer-readable storage medium having stored thereon computer-readable instructions, where when the computer-readable instructions are executed by a processor, the following steps are implemented:

receiving an access request sent by a user for target content; obtaining a content size of the target content, and querying a cache unit to find a cache block set storing the target content; calculating a space hit ratio based on the content size and a storage capacity corresponding to the cache block set; when the space hit ratio is less than a preset threshold, adjusting an initial block size of the cache unit based on the space hit ratio and a block size of lower-level storage of the cache unit to obtain a new block size, where the lower-level storage is a storage unit that directly exchanges content with the cache unit and has an access speed less than that of the cache unit; and setting a block size of a newly set up cache block of the cache unit based on the new block size.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various types of application software installed on the computer device, such as program code for the method for adjusting data storage in the embodiments. In addition, the computer-readable storage medium may be configured to temporarily store various types of data that have been output or are to be output.

It will be apparent to those skilled in the art that the various modules or steps in the embodiments of the present application can be implemented by a general-purpose computing apparatus that can be centralized on a single computing apparatus or distributed across a network formed by a plurality of computing apparatuses. Optionally, they may be implemented by program code executable by the computing apparatus, such that they may be stored in a storage apparatus and executed by the computing apparatus, and in some cases, the steps shown or described may be performed in a sequence different from the sequence described herein, or they may be respectively fabricated into individual integrated circuit modules, or a plurality of modules or steps thereof may be implemented as a single integrated circuit module. In this way, the embodiments of the present application are not limited to any specific combination of hardware and software.

The foregoing descriptions are merely illustrative of preferred embodiments of the embodiments of the present application, and are not intended to limit the patent scope of the embodiments of the present application. Any equivalent structure or equivalent process transformation made using the content of the description and accompanying drawings of the embodiments of the present application, or any direct or indirect application thereof in other related technical fields shall equally fall within the patent protection scope of the embodiments of the present application.

What is claimed is:

1. A method for adjusting data storage, comprising:
   receiving a request of accessing target content from a user;
   determining a content size of the target content, and querying a cache unit to identify a set of cache blocks storing the target content;
   determining a space hit ratio based on the content size and a storage capacity corresponding to the set of cache blocks;
   adjusting an initial block size of the cache unit based on the space hit ratio and a block size of a lower-level storage relative to the cache unit to obtain a new block size of the cache unit in response to determining that the space hit ratio is less than a predetermined threshold, wherein the lower-level storage is a storage unit configured to directly exchange content with the cache unit and have an access speed less than that of the cache unit; and
   configuring newly set up cache blocks for the cache unit based on the new block size.

2. The method for adjusting data storage according to claim 1, wherein when the target content is part of content in a target file, the determining a content size of the target content further comprises:
   dividing the target file into a sequence of data segments, each of the sequence of data segments having a same size;
   obtaining a ranking range of a subset of data segments corresponding to the target content in all the sequence of data segments; and
   determining the content size of the target content based on a content size of the target file and a ratio of a quantity of the subset of data segments in the ranking range to a quantity of all the sequence of data segments.

3. The method for adjusting data storage according to claim 2, wherein the querying a cache unit to identify a set of cache blocks storing the target content further comprises:
   identifying cache blocks corresponding to the ranking range in a cache block segment of the cache unit where the target file is stored as the set of cache blocks storing the target content.

4. The method for adjusting data storage according to claim 2, wherein when the target file is a video file and the target content is a video clip, the ranking range corresponds to a time section of the video clip in the video file.

5. The method for adjusting data storage according to claim 1, wherein the determining a space hit ratio based on the content size and a storage capacity corresponding to the set of cache blocks further comprises:
   determining the storage capacity corresponding to the set of cache blocks based on multiplying a quantity of cache blocks comprised in the set of cache blocks by the initial block size of the cache unit; and
   determining a ratio of the content size of the target content to the storage capacity corresponding to the set of cache blocks and identifying the ratio as the space hit ratio.

6. The method for adjusting data storage according to claim 1, wherein the adjusting an initial block size of the cache unit based on the space hit ratio and a block size of a lower-level storage relative to the cache unit to obtain a new block size of the cache unit further comprises:
   multiplying the space hit ratio by the initial block size to obtain an intermediate block size value; and
   adjusting the intermediate block size value based on the block size of the lower-level storage to obtain the new block size of the cache unit, wherein the block size of the lower-level storage is an integral multiple of the new block size.

7. The method for adjusting data storage according to claim 1, wherein when a plurality of requests for accessing a plurality of different pieces of content are received within a same time period, the method further comprises:
   determining a space hit ratio for each piece of content as a sub-space-hit ratio; and
   performing a weighting calculation or an average calculation on all of the sub-space-hit ratios to obtain a space hit ratio corresponding to the time period.

8. A computer device comprising a memory and a processor, wherein the memory stores computer-readable instructions executable by the processor, and when the computer-readable instructions are executed by the processor, the processor implement operations comprising:
   receiving a request of accessing target content from a user;
   determining a content size of the target content, and querying a cache unit to identify a set of cache blocks storing the target content;
   determining a space hit ratio based on the content size and a storage capacity corresponding to the set of cache blocks;
   adjusting an initial block size of the cache unit based on the space hit ratio and a block size of a lower-level storage relative to the cache unit to obtain a new block size of the cache unit in response to determining that the space hit ratio is less than a predetermined threshold, wherein the lower-level storage is a storage unit configured to directly exchange content with the cache unit and have an access speed less than that of the cache unit; and
   configuring newly set up cache blocks for the cache unit based on the new block size.

9. The computer device according to claim 8,
   wherein when the target content is part of content in a target file;
   wherein the determining a content size of the target content further comprises:
      dividing the target file into a sequence of data segments, each of the sequence of data segments having a same size,
      obtaining a ranking range of a subset of data segments corresponding to the target content in all the sequence of data segments, and
      determining the content size of the target content based on a content size of the target file and a ratio of a quantity of the subset of data segments in the ranking range to a quantity of all the sequence of data segments; and
   wherein the querying a cache unit to identify a set of cache blocks storing the target content further comprises identifying cache blocks corresponding to the ranking range in a cache block segment of the cache unit where the target file is stored as the set of cache blocks storing the target content.

10. The computer device according to claim 8, wherein the determining a space hit ratio based on the content size and a storage capacity corresponding to the set of cache blocks further comprises:
   determining the storage capacity corresponding to the set of cache blocks based on multiplying a quantity of cache blocks comprised in the set of cache blocks by the initial block size of the cache unit; and
   determining a ratio of the content size of the target content to the storage capacity corresponding to the set of cache blocks and identifying the ratio as the space hit ratio.

11. The computer device according to claim 8, wherein the adjusting an initial block size of the cache unit based on the space hit ratio and a block size of a lower-level storage relative to the cache unit to obtain a new block size of the cache unit further comprises:
   multiplying the space hit ratio by the initial block size to obtain an intermediate block size value; and
   adjusting the intermediate block size value based on the block size of the lower-level storage to obtain the new block size of the cache unit, wherein the block size of the lower-level storage is an integral multiple of the new block size.

12. The computer device according to claim 8, wherein when a plurality of requests for accessing a plurality of different pieces of content are received within a same time period, the method further comprises:
   determining a space hit ratio for each piece of content as a sub-space-hit ratio; and
   performing a weighting calculation or an average calculation on all of the sub-space-hit ratios to obtain a space hit ratio corresponding to the time period.

13. The computer device according to claim 8, wherein when the target file is a video file and the target content is a video clip, the ranking range corresponds to a time section of the video clip in the video file.

14. A non-transitory computer-readable storage medium storing computer-readable instructions, wherein execution of the computer-readable instructions by at least one processor causes the at least one processor to perform operations comprising:
   receiving a request of accessing target content from a user;
   determining a content size of the target content, and querying a cache unit to identify a set of cache blocks storing the target content;
   determining a space hit ratio based on the content size and a storage capacity corresponding to the set of cache blocks;
   adjusting an initial block size of the cache unit based on the space hit ratio and a block size of a lower-level storage relative to the cache unit to obtain a new block size of the cache unit in response to determining that the space hit ratio is less than a predetermined threshold, wherein the lower-level storage is a storage unit configured to directly exchange content with the cache unit and have an access speed less than that of the cache unit; and
   configuring newly set up cache blocks for the cache unit based on the new block size.

15. The non-transitory computer-readable storage medium according to claim 14,
   wherein when the target content is part of content in a target file;
   wherein the determining a content size of the target content further comprises:
      dividing the target file into a sequence of data segments, each of the sequence of data segments having a same size,
      obtaining a ranking range of a subset of data segments corresponding to the target content in all the sequence of data segments, and
      determining the content size of the target content based on a content size of the target file and a ratio of a quantity of the subset of data segments in the ranking range to a quantity of all the sequence of data segments; and
   wherein the querying a cache unit to identify a set of cache blocks storing the target content further comprises identifying cache blocks corresponding to the ranking range in a cache block segment of the cache unit where the target file is stored as the set of cache blocks storing the target content.

16. The non-transitory computer-readable storage medium according to claim 14, wherein the determining a space hit ratio based on the content size and a storage capacity corresponding to the set of cache blocks further comprises:
   determining the storage capacity corresponding to the set of cache blocks based on multiplying a quantity of cache blocks comprised in the set of cache blocks by the initial block size of the cache unit; and
   determining a ratio of the content size of the target content to the storage capacity corresponding to the set of cache blocks and identifying the ratio as the space hit ratio.

17. The non-transitory computer-readable storage medium according to claim 14, wherein the adjusting an initial block size of the cache unit based on the space hit ratio and a block size of a lower-level storage relative to the cache unit to obtain a new block size of the cache unit further comprises:
   multiplying the space hit ratio by the initial block size to obtain an intermediate block size value; and
   adjusting the intermediate block size value based on the block size of the lower-level storage to obtain the new block size of the cache unit, wherein the block size of the lower-level storage is an integral multiple of the new block size.

18. The non-transitory computer-readable storage medium according to claim 14, wherein when a plurality of requests for accessing a plurality of different pieces of content are received within a same time period, the method further comprises:
   determining a space hit ratio for each piece of content as a sub-space-hit ratio; and
   performing a weighting calculation or an average calculation on all of the sub-space-hit ratios to obtain a space hit ratio corresponding to the time period.

19. The non-transitory computer-readable storage medium according to claim 14, wherein when the target file is a video file and the target content is a video clip, the ranking range corresponds to a time section of the video clip in the video file.

* * * * *